(12) United States Patent
Van Schie et al.

(10) Patent No.: US 10,058,875 B2
(45) Date of Patent: Aug. 28, 2018

(54) FILTER DEVICE AND METHOD FOR REMOVING MAGNETIZABLE PARTICLES FROM A LIQUID

(71) Applicant: Lomapro B.V., RM Drunen (NL)

(72) Inventors: Lodewijk Johannes Gijsbertus Van Schie, CB Vlijmen (NL); Marinus Arnoldus Wilhelmus Maria Van Hulten, NM Drunen (NL)

(73) Assignee: ESSELENT SOLUTION B.V., Drunen (NL)

( * ) Notice: Subject to any disclaimer, the term of this patent is extended or adjusted under 35 U.S.C. 154(b) by 273 days.

(21) Appl. No.: 14/906,345

(22) PCT Filed: Jul. 25, 2014

(86) PCT No.: PCT/NL2014/050514
§ 371 (c)(1),
(2) Date: Jan. 20, 2016

(87) PCT Pub. No.: WO2015/012696
PCT Pub. Date: Jan. 29, 2015

(65) Prior Publication Data
US 2016/0151789 A1     Jun. 2, 2016

(30) Foreign Application Priority Data

Jul. 25, 2013 (NL) .................................. 2011221

(51) Int. Cl.
*B03C 1/02*     (2006.01)
*B03C 1/00*     (2006.01)
(Continued)

(52) U.S. Cl.
CPC ............... *B03C 1/02* (2013.01); *B03C 1/002* (2013.01); *B03C 1/0332* (2013.01); *B03C 1/284* (2013.01);
(Continued)

(58) Field of Classification Search
CPC .......... B03C 1/02; B03C 1/002; B03C 1/286; B03C 1/284; B03C 1/0332;
(Continued)

(56) References Cited

U.S. PATENT DOCUMENTS 4,498,987 A     2/1985 Inaba

FOREIGN PATENT DOCUMENTS

| DE | 1134173 B  | * | 8/1962 | ............. B03C 1/284 |
| DE | 10331022 A1 | * | 9/2004 | ............... D21D 5/00 |

(Continued)

OTHER PUBLICATIONS

The International Preliminary Report on Patentability (Chapter II) for PCT/NL2014/050514, dated Oct. 27, 2015.*

(Continued)

*Primary Examiner* — David A Reifsnyder
(74) *Attorney, Agent, or Firm* — Myron Greenspan Lackenbach Siegel LLP

(57) ABSTRACT

The invention relates to an improved magnetic filter device (1) for separating a fluid and magnetizable particles. The invention also relates to a method for separating a fluid and magnetizable particles, particularly by making use of a device (1) according to the invention.

24 Claims, 3 Drawing Sheets

(51) Int. Cl.
    *B03C 1/28*          (2006.01)
    *C02F 1/48*          (2006.01)
    *B03C 1/033*        (2006.01)

(52) U.S. Cl.
    CPC .............. *B03C 1/286* (2013.01); *C02F 1/481* (2013.01); *B03C 2201/18* (2013.01); *B03C 2201/20* (2013.01); *B03C 2201/22* (2013.01); *B03C 2201/24* (2013.01)

(58) Field of Classification Search
    CPC ............ B03C 2201/22; B03C 2201/20; B03C 2201/18; B03C 2201/24; C02F 1/481
    See application file for complete search history.

(56) References Cited

FOREIGN PATENT DOCUMENTS

| | | |
|---|---|---|
| GB | 2409829 | 7/2005 |
| JP | S54131169 | 10/1979 |
| WO | WO2013189549 | 12/2013 |

OTHER PUBLICATIONS

Netherlands International Search Report, dated Jun. 5, 2014—6 pages in Dutch.

\* cited by examiner

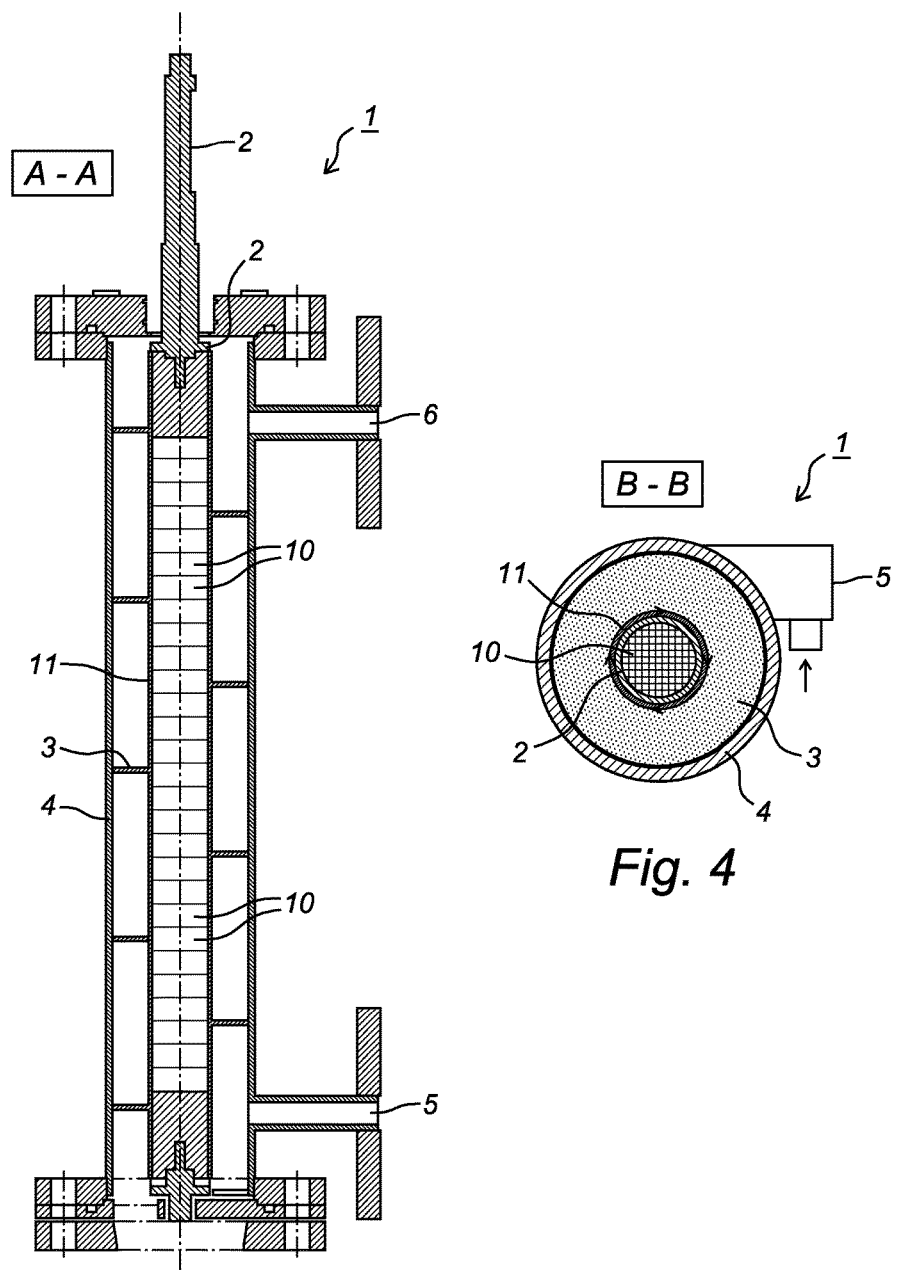

FILTER DEVICE AND METHOD FOR REMOVING MAGNETIZABLE PARTICLES FROM A LIQUID

The invention relates to a filter device for removing magnetizable particles from a fluid. The invention also relates to a method for removing magnetizable particles from a fluid, particularly by making use of a device according to the invention.

Magnetic separators, also referred to as magnetic filters, are known and are applied for, among other purposes, removing magnetizable metal particles from water, cooling lubricant and oil. A magnet is for this purpose brought into contact with a liquid flow in which metal particles are present. The metal particles, or at least some thereof, will then adhere to the magnet, whereby the liquid is purified of metal particles. Cleaning of the magnet is however necessary to prevent blockage of the magnetic separator and to allow the magnet to retain the desired attractive action. Due to the attachment of metal particles to the magnet the magnetic field lines will generally tend to run through these attached metal particles, which detracts from the magnetic attractive force in the direction of metal particles yet to be captured. Cleaning of the magnet is however relatively difficult. In the case of a manual cleaning the magnet will generally be removed from the liquid flow and be cleaned by being scraped, which is labour-intensive. Having the magnet cleaned automatically by a mechanical device is relatively difficult as a result of the relatively strong magnetic forces occurring between the magnet and the captured particles held fast by the magnet, and generally has to take place by applying hydraulic auxiliary means. The labour-intensive maintenance in the case of manual cleaning as well as the complex, expensive technical auxiliary means necessary in the case of automated cleaning make cleaning of the magnet relatively expensive.

An object of the invention is to provide an improved, in particular relatively efficient device for removing magnetizable particles from a fluid.

The invention provides for this purpose a filter device of the type stated in the preamble, comprising: at least one central shaft, at least one worm screw enclosing the central shaft, wherein at least a part of an inner side of the worm screw fits substantially closely onto at least a part of an outer wall of the elongate shaft, at least one housing enclosing the worm screw, wherein at least a part of an inner wall of the housing fits substantially closely onto at least a part of an outer side of the worm screw, whereby a helical channel is formed in the device, wherein the housing is provided with a feed for a fluid carrying magnetizable particles which connects to the helical channel and with a discharge for the fluid at least partially purified of the magnetizable particles which connects to the helical channel, and wherein the device further comprises at least one magnet for generating a magnetic field in the helical channel such that the particles will deposit on the inner wall of the housing and/or on the outer wall of the central shaft, and wherein the worm screw on the one hand and the housing and/or the central shaft on the other are rotatable relative to each other, preferably (co)axially rotatable, for the purpose of enabling transport of deposited ferromagnetic metal particles in axial direction. The filter device according to the invention can also be referred to as an improved magnetic separator. The improvement lies in the application of a worm screw which, like an Archimedes' screw, is rotated axially relative to the housing and/or the central shaft and thereby continuously or semi-continuously scrapes clean the inner wall of the housing and/or the outer wall of the central shaft during flow through the helical (or spiral) channel, wherein deposited ferromagnetic metal particles can be transported in a desired axial direction and subsequently be discharged. The deposited metal particles can in this way be discharged in relatively efficient manner during regular use of the filter device. Clogging of the filter device, and particularly of the helical channel, can in this way be prevented, and it is on the other hand possible to guarantee that the generated magnetic fields continue to run through the fluid to enable capture of further ferromagnetic metal particles. Only particles which can be magnetized (are magnetizable) can be captured by means of the one or more magnets applied. These are generally metal particles of ferromagnetic nature. There are four ferromagnetic elements, i.e. iron, nickel, cobalt and gadolinium. Neodymium and dysprosium are ferromagnetic at very low temperatures. There are however many more ferromagnetic alloys, and there are also sintered materials which are magnetic, such as ferrite, which comprises one or more of the above stated elements. Stainless steel types of the AISI 400 series and duplex stainless steel types are also magnetizable, and particles thereof can also be captured by means of the filter device according to the invention. The terms metal particles and magnetizable particles are deemed to be equivalent in the context of this patent specification. The metal particles can have a small diameter in the order of magnitude of one or several micrometers, but can also be much larger and can for instance even be formed by magnetizable bolts and nuts. The filter device will generally be applied for the purpose of purifying an industrial liquid flow, in particular a water flow, of (ferromagnetic) metal particles. These metal particles generally originate from the use of material-processing machines, such as for milling and drilling, which produce metal chips and metal swarf during use thereof. As fluid, water is generally applied as cooling liquid and becomes fouled with the metal particles during cooling of such machines. Other types of fluid, such as oil, or even gases can also be applied in the filter device instead of water. The fluid in which magnetizable particles are dispersed can thus be of diverse nature. In order to enable the most efficient possible removal of the metal particles from a fluid it is advantageous for the fluid to be guided through the helical channel in a direction opposite to the direction in which the deposited metal particles are transported and discharged.

Although it is possible to envisage applying one or more electromagnets as magnet, it is generally recommended from a financial viewpoint to apply one or more permanent magnets. It is advantageous for at least one magnet to be accommodated in the central shaft. This ensures that the ferromagnetic metal particles will deposit on the outer wall of the central shaft, which generally facilitates cleaning of the filter device. A plurality of magnets are more preferably accommodated in the central shaft. The magnetic field can in this way be extended in axial direction in controlled manner, whereby more particles, in particular ferromagnetic metal particles, can generally be removed from the fluid, in particular the liquid flow. It is particularly advantageous here for a plurality of magnets to be positioned in alternate series, whereby equivalent poles are formed between the magnets. The magnets are hereby arranged with the same poles (North (N) or South (S)) of mutually adjacent magnets toward each other, whereby the following arrangement of magnets is for instance applied: $((N-S)-(S-N))_n$, wherein $n \geq 1$. The one or more magnets are preferably arranged such that the magnetic field lines extend between the feed and the discharge of the housing such that during displacement in the direction of the discharge the particles will not pass any magnetic pole transition. The magnetic force exerted on the particles acts in this way in preferably substantially continuous manner in the same direction between the feed and the discharge, whereby the magnetic field lines will facilitate and not hinder the displacement. In this embodiment variant the effective magnetic poles are positioned on a side of the feed facing away from the discharge on the one hand and a side of the discharge facing away from the feed on the other. There will in that case not be a pole transition present between the feed and the discharge. The magnetic flux density at these equivalent poles preferably amounts to at least 5000 Gauss (0.5 T) in order to be able to exert sufficient attractive force on the metal particles so as to extract them from the fluid flow. Because the metal particles tend to deposit particularly on and around the magnetic poles, this particular arrangement of magnets creates deposition lines formed by metal particles and visible on the central shaft (or on the housing). The length of the magnets is deliberately limited here in order to have the poles succeed each other at a relatively short distance (1-3 cm). It is further advantageous for a part, particularly an outer end, of the central shaft not to be provided with magnets. This makes it possible to displace the attached metal particles by means of the worm screw to this magnet-free part, where the metal particles can be removed relatively easily from the central shaft.

Although it is possible to envisage the worm screw and the housing engaging on each other with clamping fit, the worm screw and the housing are preferably connected rigidly to each other. This facilitates the mutual fixation of the two components. Since the housing and the worm screw are usually manufactured from metal, particularly stainless steel, or plastic, the worm screw and the housing can be mutually connected by means of a welded connection. The worm screw and the central shaft fit closely to each other and preferably exert a bias on each other. This prevents the formation of gaps between the worm screw and the central shaft, whereby the worm screw can scrape the outer wall of the central shaft and displace the metal particles deposited thereon in relatively reliable manner. This mutual engagement must preferably be such that damage to the worm screw and the central shaft is prevented as far as possible. It is therefore advantageous for the mutual engagement to take place through application of a resilient (elastic) sealing material. This sealing material can form an integral part of the central shaft and/or the worm screw, although is preferably arranged as separate layer on the inner side of the worm screw and/or the outer wall of the central shaft. This makes it possible to manufacture the worm screw and the outer wall from stronger, more rigid materials such as metal and/or (hard) plastic, preferably polytetrafluoroethylene (PTFE), also known as Teflon®. The sealing material will generally be manufactured from plastic and/or ceramic. The sealing material can be glued as sealing layer to the central shaft. It is also possible to envisage the sealing layer being arranged round the central shaft by means of shrinking or by means of direct coating.

The central shaft preferably has a substantially circular cross-section. This cross-section is preferably substantially constant in axial direction, whereby the central shaft takes a substantially cylindrical form. This makes it easier for the worm screw to engage on the central shaft. The central shaft need not lie per se in the centre of the device defined by the longitudinal axis of the housing, and can also be positioned to some extent eccentrically. In the case of an eccentric positioning of the central shaft the distance between the central shaft and the housing around the central shaft will not be constant. Since this mutual distance is filled by the worm screw, a worm screw will then also be applied with a screw blade having a width which varies in the peripheral direction of the worm screw. Said constructions are however in general relatively expensive to manufacture. It is generally recommended to keep the construction relatively simple by positioning the central shaft in the centre of the worm screw. The housing and the central shaft are positioned coaxially here. The shortest distance between the central shaft and the housing generally lies here between 2 and 5 centimeters. At such a distance substantially the whole helical channel can be subjected to the magnetic field, while the channel can still be given a sufficiently large form.

As stated above, the housing is preferably provided on an end surface with a discharge for metal particles transported in the direction of the end surface by means of the worm screw. This end surface is preferably formed by an underside, whereby the metal particles are transported in downward direction, so in the direction of the gravitational force, which generally enhances the separation of the (metal) particles from the fluid flow via the discharge. The discharge will generally be closable by means of at least one shut-off valve, preferably two shut-off valves, whereby sufficient metal particles are first captured before being discharged via the discharge.

The filter device is preferably configured such that the housing and the worm screw are disposed in stationary manner, and wherein the central shaft is disposed for axial rotation. The central shaft is preferably configured here for co-action with an electric motor for enabling axial rotation of the shaft. This electric motor is generally positioned above the central shaft. The electric motor will usually co-act with the central shaft via a transmission. The number of revolutions which the electric motor can cause the central shaft to make can vary, but preferably lies between 2 and 10 revolutions per minute. It is advantageous for the central shaft to be displaceable in axial direction in order to allow thermal expansion in the lengthwise direction, whereby thermal expansion in the width direction is prevented as far as possible. The housing is preferably configured for stationary mounting on a support structure, particularly a support frame.

In a preferred embodiment the device is provided with turbulence-generating means for generating a turbulent water flow in the helical channel. Creating turbulence in the helical channel generally facilitates the capability for magnetic capture of the ferromagnetic metal particles. The turbulence-generating means can be embodied in diverse ways and can for instance be formed by embodying the feed and/or the discharge which connect to the housing such that the fluid flow is fed or discharged at an angle, for instance tangentially, to or from the housing. This forces the fluid flow to pass through one or more angles (sharp bends), whereby turbulence is generated. It is also possible to envisage placing one or more obstacles, such as baffles, in the helical channel, whereby turbulence is generated. Turbulence can also be created by the shaping of the worm screw, for instance by having the pitch of the worm screw vary in lengthwise direction. It is generally still more advantageous for the flow of the fluid in the helical channel to be not of laminar or turbulent nature but of rotating nature, wherein the flow is directed away from the magnet at the top and directed toward the magnet at the bottom. The gravitational force ensures that particles move in the direction of the bottom in the channel and the rotating flow transports these particles in the direction of the magnet.

The invention also relates to a method for removing magnetizable particles from a fluid, particularly by making use of a filter device according to the invention, comprising the steps of: A) guiding a fluid carrying magnetizable particles through a helical channel, this helical channel being bounded by a plurality of side walls and a worm screw extending therebetween, B) subjecting the fluid carrying magnetizable particles to a magnetic field in the helical channel, whereby at least some of the particles will deposit against a side wall of the helical channel, and C) having the worm screw and at least one side wall rotate axially relative to each other, whereby deposited particles are transported in axial direction. Advantages and embodiment variants have already been described at length in the foregoing. The method preferably also comprises step D), comprising of discharging the deposited (metal) particles transported by means of the worm screw. This results in the metal particles being completely separated from the fluid, which generally enhances the purification of the fluid. The helical channel is preferably bounded on an inner side by a central shaft, and wherein the central shaft is rotated axially during step C). Rotation preferably takes place by means of an electric motor. The above stated steps A)-C) are preferably performed simultaneously, whereby the purification of the fluid, i.e. the separation of magnetizable particles and the fluid, and the carrying away, preferably discharging, of the particles take place simultaneously. This makes it possible to perform the method according to the invention as a continuous process.

The invention will be elucidated on the basis of the non-limitative exemplary embodiment shown in the following figures. Herein:

FIG. 3 shows a cross-section of the filter device according to FIG. 2 along line A-A, and FIG. 4 shows a cross-section of the filter device according to FIG. 2 along line B-B.

Figure 1:
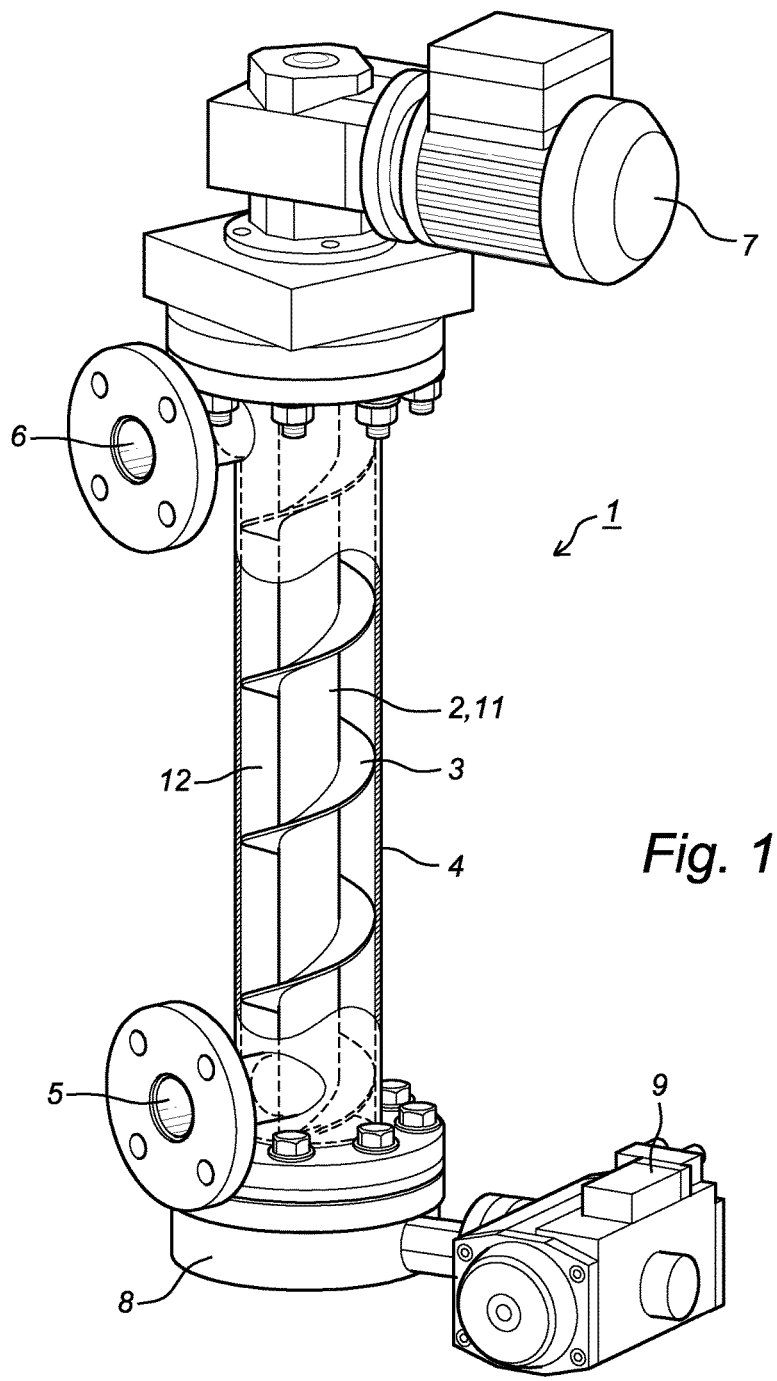
FIG. 1 is a perspective view of a filter device according to the invention.

FIG. 1 is a perspective view of a filter device 1 according to the invention. Filter device 1 is also referred to as magnetic separator or magnetic filter. Filter device 1 comprises a rotatable central shaft 2 around which is arranged a stationary worm screw 3 (Archimedes' screw) which engages on central shaft 2, wherein worm screw 3 is connected on an outer peripheral side to a housing 4 by means of a local (semi-continuous) welded connection. Housing 4 encloses the worm screw all the way round, although has been partially omitted in FIG. 1 in order to visualize worm screw 3 and central shaft 2. The housing is provided with a feed 5 for process water carrying metal particles and with a discharge 6 at a higher position for at least partially purified water. An upper end surface 4a of housing 4 is coupled to an electric motor 7 for axial rotation of central shaft 2. The rotation direction of central shaft 2 is clockwise as seen in top view. A lower end surface 4b of housing 4 is provided with a shut-off valve 8 which can be selectively opened and closed by means of a pneumatic control element 9. Shut-off valve 8 functions as discharge for metal particles, as will be further elucidated below. The core of central shaft 2 is provided with a plurality of permanent magnets 10 (see FIGS. 3 and 4) which are arranged alternatingly in order to thus be able to form equivalent poles between adjacent magnets. An outer wall 2a of central shaft 2 is manufactured from stainless steel, which is also the case for worm screw 3 and housing 4. Outer wall 2a of central shaft 2 is covered all the way round with a film layer 11 (see FIGS. 3 and 4) manufactured from Teflon®. Film layer 11 seals a possible space between worm screw 3 and central shaft 2 and is moreover sufficiently smooth to allow axial rotation of central shaft 2 during engagement on the stationary worm screw 3. Housing 4, worm screw 3 and central shaft 2 mutually enclose a helical (corkscrew-like) channel 12 to which both the feed 5 and discharge 6 connect. The width of helical channel 12, formed by the mutual distance between housing 4 and central shaft 2, is preferably such that the magnetic field lines generated by magnets 10 extend over the whole width of channel 12. In this exemplary embodiment this width amounts to about 3 centimeters. The length of housing 4 amounts to about 60 centimeters. The diameter of central shaft 2 amounts to about 4 centimeters. The height of each magnet amounts to about 1.5 centimeters. The maximum magnetic flux density at the equivalent poles between two magnets amounts to about 7000 Gauss in this exemplary embodiment. A lower part of central shaft 2, with a length of about 6.5 centimeters, is not provided with magnets. Worm screw 3 makes about 5 revolutions in the housing, this amounting to a pitch of about 12 centimeters. Electric motor 7 is configured to rotate central shaft 2 at a speed of revolution of about 5.7 revolutions per minute. Filter device 1 shown in this non-limitative exemplary embodiment is suitable for processing a maximum of 10 m$^3$ of process water per hour.

Figure 2:
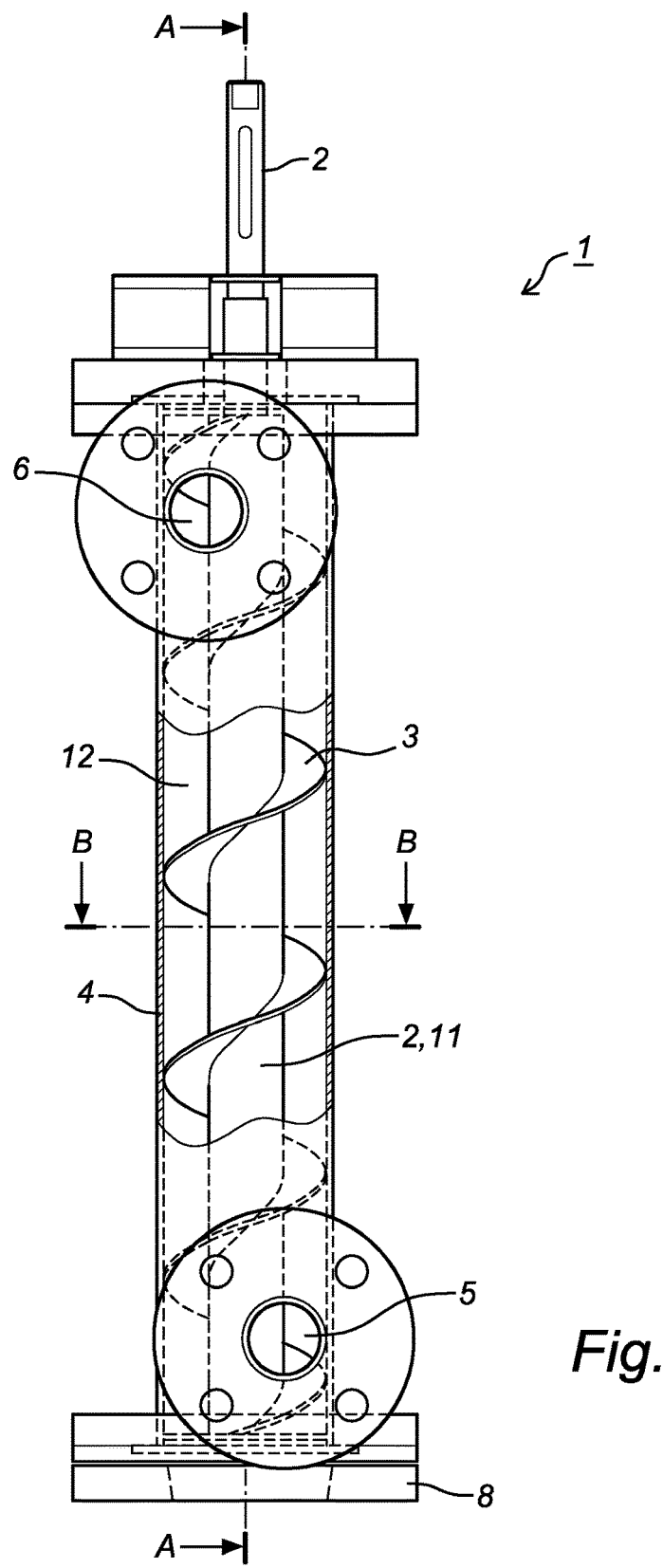
FIG. 2 is a cut-away side view of the filter device according to FIG. 1.

The operation of filter device 1 can be described as follows. A process flow carrying metal particles is pumped via feed 5 into filter device 1 by means of a pump (not shown). This process water will pass through helical channel 12 and be discharged from filter device 1 via discharge 6. While process water is flowing through helical channel 12 the electric motor 7 will axially rotate central shaft 2. Owing to the presence of permanent magnets 10 in the central shaft ferromagnetic metal particles present in the process water will be attracted by magnets 10 and will deposit on central shaft 2, or at least on the film layer 11 arranged around central shaft 2. As a result of the axial rotation of central shaft 2, and thereby of film layer 11, the deposited metal particles will be pushed in downward direction by worm screw 3. During this downward displacement the metal particles will move over the surface of film layer 11 until the metal particles are no longer attracted by the magnetic field lines in the lower part of central shaft 2. Shut-off valve 8 will be operated periodically by means of the pneumatic control element 9, whereby the metal particles can be discharged from filter device 1. Positioned at some distance under shut-off valve 8 is a second shut-off valve (not shown). In this exemplary embodiment the upper shut-off valve 8 is open during flow through filter device 1, and the lower shut-off valve is positioned in closed position. During flow through filter device 1 metal particles will be captured and transported into a discharge compartment formed between the two shut-off valves. It is possible by means of a sensor (not shown) to detect whether the discharge compartment is sufficiently filled with metal particles. Should this indeed be the case, the upper shut-off valve 8 is then closed and the lower shut-off valve opened in order to release and remove the metal particles from filter device 1. Compressed air or water is possibly used here to enable improved emptying of the discharge compartment. After emptying of the discharge compartment the lower shut-off valve will once again be positioned in closed position and the upper shut-off valve 8 will be positioned in opened position. The pump need not be switched off during this process, whereby flow through filter device 1 and thereby the separation of—in this exemplary embodiment—the water flow and the metal particles can take place in continuous manner. Purification of the process water and transporting of captured ferromagnetic metal particles in opposite direction can thus be performed simultaneously. It is noted for the sake of completeness that electric motor 7 is not shown in FIGS. 2-4. FIG. 4 further shows that it is possible to opt to provide feed 5 with a transverse (tangential) inlet in order to develop turbulence in the process water, which generally enhances the capture of magnetic or magnetizable metal particles. The same measure can be applied at discharge 6 for the process water.

It will be apparent that the invention is not limited to the exemplary embodiments shown and described here, but that within the scope of the appended claims numerous variants are possible which will be self-evident to the skilled person in the field.

The invention claimed is:

1. Filter device for removing magnetizable particles from a fluid, comprising:
    a central shaft,
    a worm screw enclosing the central shaft, wherein an inner side of the worm screw fits substantially closely onto an outer wall of the central shaft,
    a housing enclosing the worm screw all the way round, wherein an inner wall of the housing is connected rigidly to an outer side of the worm screw, whereby a helical channel is formed in the device, wherein the housing is provided with a feed for a fluid carrying magnetizable particles which connects to the helical channel and with a discharge for the fluid at least partially purified of the magnetizable particles which connects to the helical channel and which is located at a distance from said feed, such that the device is configured to force fluid to flow from the feed though the helical channel according to a helical flow path to the discharge, and
    wherein the device further comprises at least one magnet accommodated in the central shaft for generating a magnetic field in the helical channel such that magnetizable particles will deposit on an outer wall of the central shaft, and wherein the worm screw on the one hand and the central shaft on the other are rotatable relative to each other for the purpose of enabling transport of deposited magnetizable particles in an axial direction.

2. Filter device as claimed in claim 1, wherein a plurality of magnets are accommodated in the central shaft.

3. Filter device as claimed in claim 2, wherein a plurality of magnets are positioned in alternate series, whereby equivalent poles are formed between the magnets.

4. Filter device as claimed in claim 2, wherein a part of the central shaft is not provided with magnets.

5. Filter device as claimed in claim 1, wherein the worm screw and the central shaft connect to each other in a substantially sealing manner.

6. Filter device as claimed in claim 5, wherein the inner side of the worm screw is provided with a sealing layer.

7. Filter device as claimed in claim 5, wherein the outer wall of the central shaft is provided with a sealing layer.

8. Filter device as claimed in claim 7, wherein the sealing layer is glued to the central shaft.

9. Filter device as claimed in claim 7, wherein the sealing layer is manufactured at least partially from polytetrafluoroethylene (PTFE).

10. Filter device as claimed in claim 1, wherein the central shaft is positioned in the centre of the worm screw.

11. Filter device as claimed in claim 1, wherein the central shaft takes an elongate form.

12. Filter device as claimed in claim 1, wherein the central shaft is manufactured from stainless steel.

13. Filter device as claimed in claim 1, wherein the housing is positioned substantially vertically.

14. Filter device as claimed in claim 1, wherein the housing is provided on an end surface with a discharge for magnetizable particles transported in the direction of the end surface by means of the worm screw.

15. Filter device as claimed in claim 14, wherein the discharge for magnetizable particles is closable.

16. Filter device as claimed in claim 14, wherein the discharge for magnetizable particles is positioned on a lower end surface of the housing.

17. Filter device as claimed in claim 1, wherein the central shaft is configured for co-action with an electric motor for allowing axial rotation of the shaft.

18. Filter device as claimed in claim 1, wherein the housing is configured for stationary mounting on a support structure.

19. Filter device as claimed in claim 1, wherein the shortest distance between the central shaft and the housing lies between 2 and 5 centimeters.

20. Filter device as claimed in claim 1, wherein the central shaft is displaceable in the axial direction.

21. Filter device as claimed in claim 1, wherein the device is provided with turbulence-generating means for generating a turbulent flow of the fluid in the helical channel.

22. Method for separating magnetizable particles and a fluid, comprising the steps of:
    A) using a filter device comprising:
    a central shaft,
    a worm screw enclosing the central shaft, wherein an inner side of the worm screw fits substantially closely onto an outer wall of the central shaft,
    housing enclosing the worm screw all the way round, wherein an inner wall of the housing is connected rigidly to an outer side of the worm screw, whereby a helical channel is formed in the device, wherein the housing is provided with a feed for a fluid carrying magnetizable particles which connects to the helical channel and with a discharge for the fluid at least partially purified of the magnetizable particles which connects to the helical channel and which is located at a distance from said feed, such that the device is configured to force fluid to flow from the feed though the helical channel according to a helical flow path to the discharge, and
    wherein the device further comprises at least one magnet accommodated in the central shaft for generating a magnetic field in the helical channel such that magnetizable particles will deposit on an outer wall of the central shaft, and wherein the worm screw on the one hand and the central shaft on the other are rotatable relative to each other for the purpose of enabling transport of deposited magnetizable particles in an axial direction,
    B) forcing a fluid carrying magnetizable particles through the helical channel bounded by a plurality of side walls and the worm screw extending therebetween to flow from the feed though the helical channel according to a helical flow path to the discharge,
    C) subjecting the fluid carrying magnetizable particles to a magnetic field in the helical channel, whereby at least some of the magnetizable particles will deposit against the central shaft, and
    D) having the worm screw and at least one side wall rotate axially relative to each other, whereby deposited magnetizable particles are transported in axial direction, wherein the central shaft is rotated axially.

23. Method as claimed in claim 22, wherein the method also comprises step E), comprising discharging the deposited particles transported by means of the worm screw.

24. Method as claimed in claim 22, wherein steps B)-D) are performed simultaneously.

\* \* \* \* \*